June 13, 1972 C. P. SANDBANK ET AL Re. 27,385

SCANNED LINE RADIATION SOURCE USING A REVERSE BIASED P-N JUNCTION ADJACENT A GUNN DIODE

Original Filed June 2, 1967

Inventors
CARL P. SANDBANK
MICHAEL B. N. BUTLER
By Jordan Bogat
Attorney

United States Patent Office

Re. 27,385
Reissued June 13, 1972

27,385

SCANNED LINE RADIATION SOURCE USING A REVERSE BIASED P-N JUNCTION ADJACENT A GUNN DIODE

Carl Peter Sandbank, Bishop's Stortford, and Michael Brian Neilson Butler, Sawbridgewarth, England, assignors to International Standard Electric Corporation, New York, N.Y.

Original No. 3,447,044, dated May 27, 1969, Ser. No. 643,201, June 2, 1967. Application for reissue Oct. 20, 1969, Ser. No. 871,810
Int. Cl. H01l *15/06*
U.S. Cl. 317—235 R 6 Claims

Matter enclosed in heavy brackets [ ] appears in the original patent but forms no part of this reissue specification; matter printed in italics indicates the additions made by reissue.

ABSTRACT OF THE DISCLOSURE

A solid state display device employing a light emitting P-N junction adjacent a body of semiconductive material exhibiting moving high field instability effects. As the high field domain travels through said body, electrons from said domain traverse the reverse-biased P-N junction to cause the emission of visible light from the vicinity of said junction. The intensity of the emitted light may be modulated by varying the magnitude of the reverse bias applied to the junction.

Related applications

Figure 1:
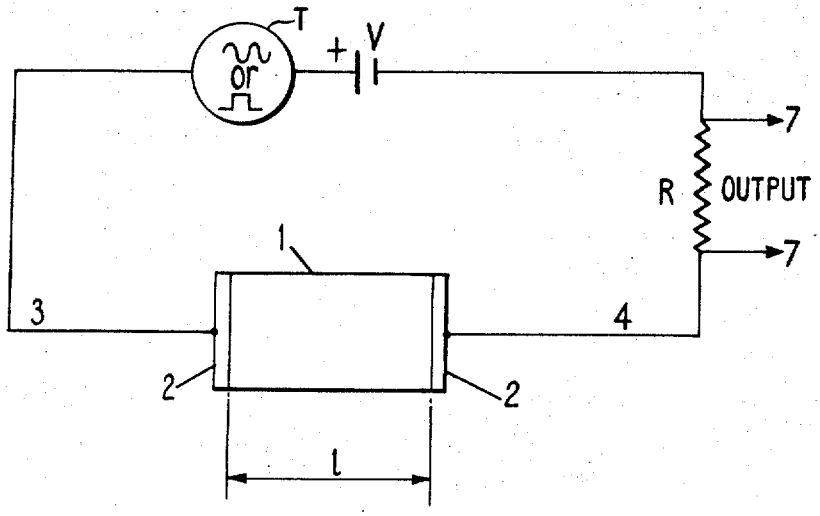

The subject matter of this application is generally related to that disclosed in copending application Ser. No. 583,003 (filed Sept. 29, 1966) and assigned to the assigned of the instant application.

Background of the invention

This invention relates to scanned line radiation sources including semiconductive material exhibiting moving high field instability effects.

If a crystal of certain semiconductive materials is subjected to a steady electrical field exceeding a critical threshold value the resultant current flowing through the crystal contains an oscillatory component of frequency determined by the transit of a space charge distribution between the crystal contact areas. There are several examples of this phenomenon; three of these are given below:

(a) It was first reported by J. B. Gunn for III–V semiconductors. (Solid State Communications, volume 1, page 88, 1963), and for these materials the phenomenon is due to electron transfer from a high to a low mobility state;

(b) In piezoelectric semiconductor materials, for example cadmium sulphide, the high electric field domain phenomenon has been reported by W. H. Haydl and C. F. Quate (Stanford University Microwave Laboratory Report—M.L. 1403, January 1966). These high electric field domains are formed by acoustic amplification processes in semiconducting material which produce sharp current saturation effects and the trapping of electrons in a travelling domain of high acoustic amplitude;

(c) In high resistivity (typically $10^6$ to $10^8$ ohms/cm.) semiconducting materials, the phenomenon gives rise to high electric field domains which contain trapping centres whose trapping cross-section is electric-field dependent. This phenomenon has been reported for gallium arsenide by D. C. Northrop, P. R. Thornton and K. E. Trezire (Solid State Electronics, volume 7, page 17, 1964) and by M. Andre Barraud (Comptes Rendus, volume 256, page 3632, 1963) and for gold doped germanium by B. K. Ridley and Pratt (Physics Letters, volume 4, page 300, 1963 and Journal of Physical Chemistry of Solids, volume 26, page 21, 1965). The high electric field domains propagate by a process in which electrons are lifted out of traps, carried a short distance in the applied field and then trapped again.

The frequency of oscillation is determined primarily by the length of the current path through the crystal. The phenomenon has been detected, as previously stated, in III–V semiconductors such as gallium arsenide and indium phosphide having n-type conductivity and also in certain piezoelectric semiconductors.

The term "semiconductive material exhibiting high field instability effects" is used herein to include any material exhibiting the effect as defined in the preceding paragraphs, or exhibiting similar domain-transit phenomena which may be based on somewhat different internal mechanisms.

The value of the applied field below which spontaneous self-oscillation does not occur will be termed the threshold value. If the value of the steady electrical field at some point within the body is caused by the action of an input signal to exceed the threshold value for a time (less than 1 nanosecond for a Gunn effect domain less than 1 microsecond for an acoustic effect domain and less than $10^{-3}$ to $10^4$ secs. for a trapping effect domain) shorter than the instability transit time i.e. for the Gunn effect domain $0.8\times10^7$ cms./sec. for the trapping effect domain $10^{-4}$ to $10^3$ cms./sec. and for the acoustic effect domain $2\times10^5$ cms./sec. between the two contact areas between which the field is applied, the current passed through the body by the external source of potential difference will undergo a single excursion from its steady state value to provide an output pulse giving power gain.

In order to obtain the form of single pulse operation defined in the preceding paragraph the steady state value of the applied field must exceed a lower threshold value, determined by experiment for a given material and typically between 50% and 75% of the threshold value. The steady state field may be continuously applied or may be pulsed to reduce the total power dissipation in the device.

An object of the invention is to provide apparatus for obtaining radiation (including visible radiation) originating from moving high field domains and means for modulating the intensity of said radiation.

Summary

The invention provides a scanned line radiation source including a body of semiconductive material exhibiting high field instability effects having formed thereon a layer of injection luminescent semiconductive material, said layer forming a P-N junction with said body, means for applying between spaced contact areas on said body a potential difference producing within said body an electric field which exceeds the critical threshold value thereby causing a high field domain to be formed which will propagate along said body, and means for applying a reverse biasing signal across said P-N junction to provide a barrier region at said junction, whereby radiation is emitted from said P-N junction as said high field domain propagates along said body.

In the drawing

Figure 2:
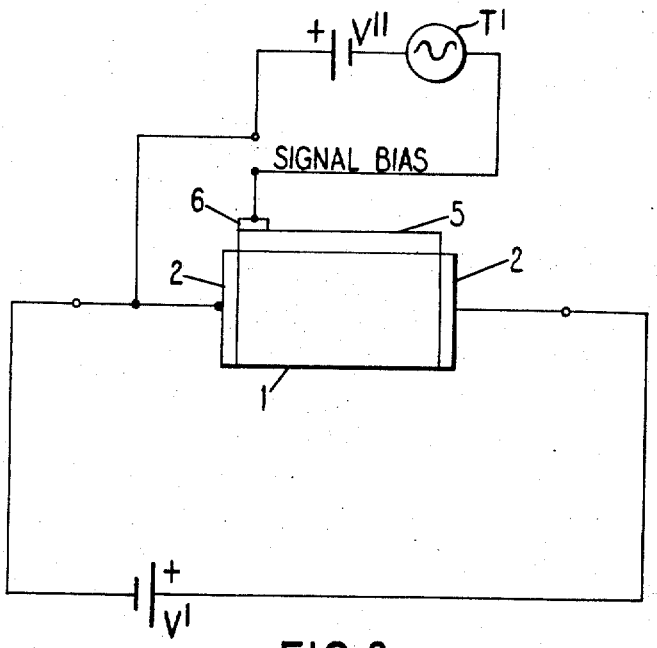

FIGURE 1 shows diagrammatically a pulse generator unit employing a body of semiconductor material exhibiting high field instability effects; and FIGURE 2 shows diagrammatically a scanned line visible radiation source which utilizes the pulse generator shown in the drawing according to FIGURE 1.

Detailed description

Referring to FIGURE 1, the active semiconductor element, which may, e.g., comprise n-type gallium arsenide (GaAs), germanium (Ge) or cadmium sulphide (CdS), consists of a parallel-sided disc 1 having ohmic contact areas 2 secured to its plain faces. A unidirectional voltage source V is used to apply a potential difference of controllable value between the contact areas 2, and an output circuit including the resistance element R and the output terminals 7 is arranged to extract any oscillatory component of the current flowing in the crystal.

The phenomenon referred to above manifests itself by the appearance in the output circuit (i.e. cross the terminals 7) of an oscillatory component in the current through the crystal 1 when the potential difference applied across the crystal from the undirectional voltage source exceeds a critical threshold value; for a crystal of gallium arsenide of length $2\times10^{-2}$ cm. the critical potential necessary to cause oscillation is of the order of 60 volts, corresponding to a field within the crystal of the order of 3,000 volts per centimeter, the self-oscillatory frequency being directly related to the length l (typically 1 to 2.5 mm. for GaAs, 1 mm. for Ge and 1 mm. for CdS) of the crystal and being of the order of $10^9$ cycles per second.

In another mode of operation, the biasing potential difference V applied between the contact areas 2 is a fraction determined by experiment of the potential necessary to cause self-oscillation and is chosen so that an oscillatory wavform or trigger pulse super-imposed on the biasing potential by an external source T carries the crystal 1 into its self-oscillatory condition for a short interval of time during each cycle of the input frequency; in other words the peak value of the oscillatory signal voltage T is caused to be just sufficient to raise the electric field within the crystal above the threshold value. In these conditions it is found that each triggering of the crystal 1 by the peak of at trigger pulse T for example, causes a reduced current pulse, drawing power from the potential source, to appear in the output circuit. Thus an oscillatory waveform applied to the device will cause a corresponding train of sharp current pulses to appear at the output. The operation of the device is virtually independent of input frequency provided that the self-oscillatory frequency is at no time exceeded. The power ouput available from the device depends on the dissipation permissible within the crystal 1. The output power may amount to several watts, but since the efficiency is relatively low this will involve a relatively high dissipation within the crystal. The driving potential V may be pulsed to reduce the quiescent dissipation.

Referring to FIGURE 2, a scanned line visible light source which utilizes the pulse generator shown in the drawing according to FIGURE 1 is shown diagrammatically. A further layer 5 of injection luminescent semiconductive material, for example, P-type gallium phosphide is formed onto one side of the N-type gallium arsenide parallel-sided disc 1 to provide a P-N hetero-junction device. An ohmic auxiliary contact area 6 is secured to the face of the layer 5 at one end of the disc 1.

If a unidirectional voltage source V′ is connected/ to the disc 1 as shown in the drawing according to FIGURE 2 such that an electric field is applied across the disc 1, as previously stated, a high field domain will be formed either by the Gunn effect or the trapping effect which will propagate along the device from the cathode (left) contact area 2 to the anode (right) contact area 2. If the applied field is maintained, then another high field domain will be launched at the cathode as soon as the previous domain has entered the anode.

By applying a reverse signal bias V″ to the layer 5 between the cathode contact area and the auxiliary contact area 6 as shown in the drawing according to FIGURE 2, electrons in the region of the high field domain will be injected into the P-type gallium phosphide layer 5 by tunnelling across the P-N junction barrier formed by the signal bias; the electrons in the region of the high field domain are the only ones injected since these are the only electrons which are "hot" enough, i.e. are in sufficiently high energy states to traverse the barrier, by virtue of the domain field.

When the "hot" electrons enter the gallium phosphide layer 5, they combine with holes and emit visible radiation from the vicinity of the P-N junction as the high field domain propagates along the disc 1, thereby providing a scanned line of visible radiation.

If the signal bias applied between the auxiliary contact area 6 and the cathode contact area is varied by the source T″, the barrier height will also be varied by a proportional amount with the result that the intensity of the light output from the device will be modulated as the high field domain propagates along the disc 1.

The layer 5 may be made sufficiently thin such that the visible radiation emitted from the region of the P-N junction is also emitted from the upper surface of the layer 5 to provide a moving strip of visible radiation.

When the parallel sided disc 1 is of germanium or cadmium sulphide, the further layer 5 will need to be of a semiconductive material which is of the opposite conductivity type to the disc 1 in order to form a P–N junction therewith and which exhibits the necessary injection luminescent properties.

While the principles of the invention have been described above in connection with specific embodiments, and particular modifications thereof, it is to be clearly understood that this description is made only by way of example and not as a limitation of the scope of the invention.

What we claim is:

1. A scanned line radiation source, comprising:

a body of semiconductive material of one conductivity type exhibiting high field instability effects in regions of said body subjected to an electric field in excess of a given threshold value;

a layer of injection luminescent semiconductive material of opposite conductivity type on said body, said layer forming a P-N junction with the adjacent portion of said body;

means for applying between spaced contact areas on said body a potential difference sufficient to produce within said body an electric field which exceeds said threshold value thereby causing a moving high field domain to be formed; and means [including an auxiliary contact area on said layer] for applying a reverse biasing potential difference across said P-N junction to provide a barrier region at said junction, whereby radiation is emitted from said P-N junction as said high field domain propagates along said body.

2. A scanned line radiation source according to claim 1, wherein said radiation is visible and said means for applying a biasing potential difference across said P-N junction is variable in response to a control signal, so that the intensity of said visible radiation may be modulated by said control signal as said high field domain propagates through said body.

3. A scanned line radiation source according to claim 1, wherein the thickness of said layer of injection luminescent semiconductive material is such that visible radiation is emitted from the surface of said layer as said high field domain propagates through said body.

4. A scanned line radiation source according to claim 1, wherein said body comprises gallium arsenide.

5. A scanned line radiation source according to claim 4, wherein said layer comprises gallium phosphide.

*6. A scanned line radiation source according to claim 1 wherein said means for applying a reverse biasing poten-*

*tial difference includes an auxiliary contact area on said layer.*

References Cited

The following references, cited by the Examiner, are of record in the patented file of this patent or the original patent.

UNITED STATES PATENTS

| | | | |
|---|---|---|---|
| 3,365,583 | 1/1968 | Gunn | 307—305 |
| 2,769,926 | 11/1956 | Lesk | 307—88.5 |
| 3,312,910 | 4/1967 | Offner | 331—94.5 |

OTHER REFERENCES

Braslau: I.B.M. Tech. Discl. Bull., vol. 9, February 1967, p. 1111.

JOHN W. HUCKERT, Primary Examiner

M. H. EDLOW, Assistant Examiner

U.S. Cl. X.R.

317—235 N, 234 V, 235 AC, 234 S